Figure 1:
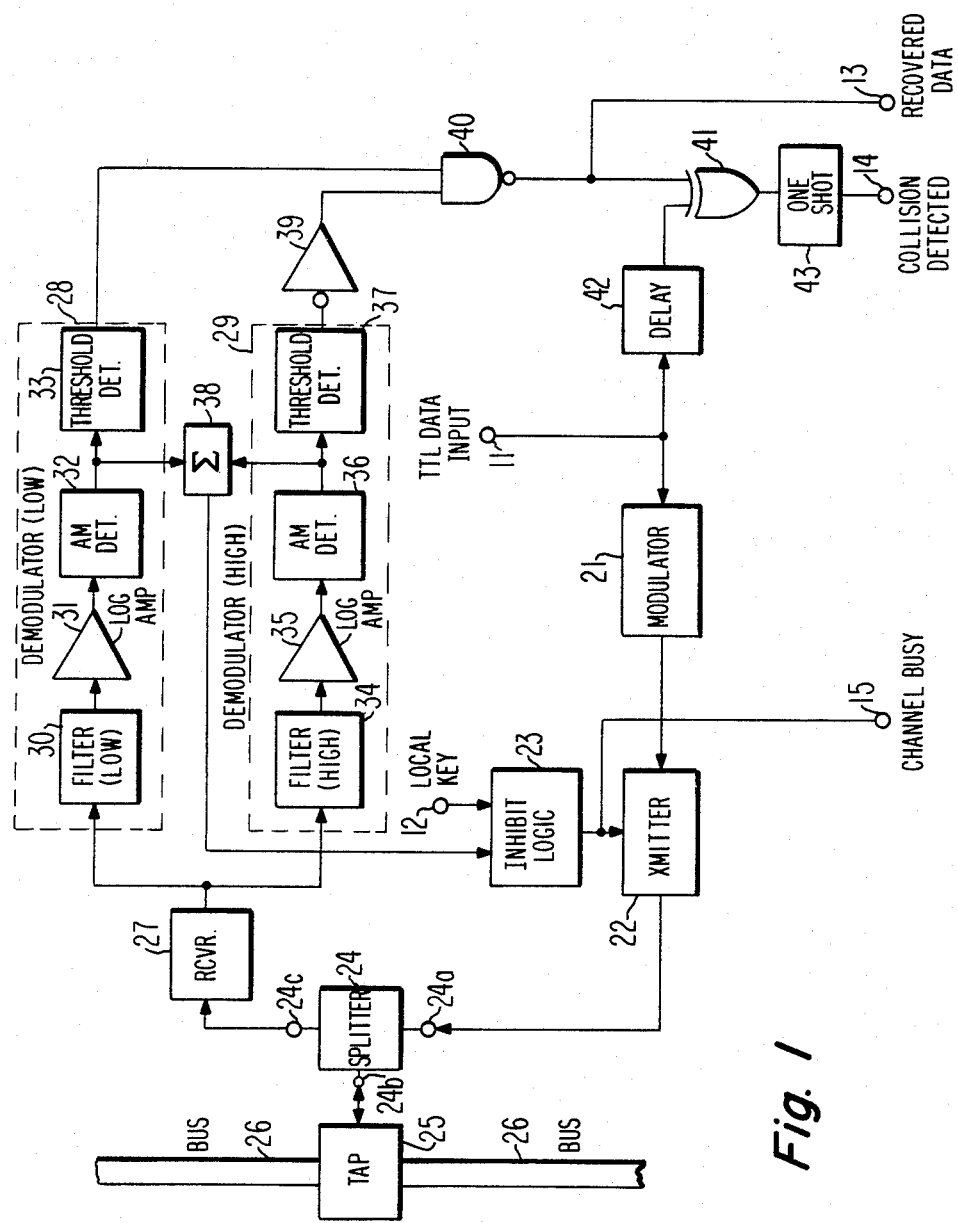

United States Patent [19]

Basile

[11] Patent Number: 4,519,074
[45] Date of Patent: May 21, 1985

[54] TRANSCEIVER HAVING COLLISION DETECTION CAPABILITY FOR CONTENTION-FORMATTED FDM LOCAL AREA NETWORKS

[75] Inventor: Philip C. Basile, Turnersville, N.J.

[73] Assignee: RCA Corporation, Princeton, N.J.

[21] Appl. No.: 499,796

[22] Filed: May 31, 1983

[51] Int. Cl.³ .............................................. H04J 6/00
[52] U.S. Cl. ..................................... 370/124; 370/85; 340/825.5; 455/58
[58] Field of Search ...................... 455/58; 370/85, 93, 370/124; 375/36; 340/825.5, 825.51

[56] References Cited

U.S. PATENT DOCUMENTS

| | | | |
|---|---|---|---|
| 4,063,220 | 12/1977 | Metcalfe et al. | 340/147 LP |
| 4,099,024 | 7/1978 | Boggs et al. | 178/71 R |
| 4,292,623 | 9/1981 | Eswaran et al. | 340/147 R |
| 4,328,586 | 5/1982 | Hansen | 375/36 |
| 4,366,480 | 12/1982 | Van Hatten | 340/825.51 |
| 4,376,278 | 3/1983 | Jacobsthal | 340/825.5 |
| 4,409,593 | 10/1983 | Bose | 370/89 |

Primary Examiner—Douglas W. Olms
Assistant Examiner—Timothy K. Greer
Attorney, Agent, or Firm—Joseph S. Tripoli; Robert L. Troike; Christopher Lyle Maginniss

[57] ABSTRACT

A transceiver provides data collision detection and avoidance in a contention-formatted, FDM communications network using FSK modulation. Locally-generated baseband data is compared to recovered baseband data received from the system bus. A failure to compare indicates that there has been a data collision. The wide disparities in amplitude between locally-generated FDM signals and signals received from the bus are accommodated by a signal splitter which provides greater attenuation of the local signal than the generally weaker bus signal, and by the use of logarithmic amplifiers which generate relatively constant output levels for a wide range of input signal amplitudes. Collision avoidance is provided by monitoring the bus signal demodulators for data activity, and by inhibiting the local transmitter when such activity is detected, subject to an override during transmission by the local station.

27 Claims, 2 Drawing Figures

TRANSCEIVER HAVING COLLISION DETECTION CAPABILITY FOR CONTENTION-FORMATTED FDM LOCAL AREA NETWORKS

The present invention relates generally to the field of data communications and, more particularly, to an apparatus for data communications systems which allows detection of collisions of information signals within a communications medium.

In multi-access communications systems, or networks, for interconnecting multiple devices or stations in a communications network, means must be provided for controlling access of the devices to the communications channel. Such a system may employ frequency division multiplexing (FDM) to provide a multiplicity of transmissions over a single coaxial cable interconnecting all stations. In an FDM system two or more stations are interconnected by the assignment of a single frequency band for exclusive use by those stations for the duration of their interconnect. In addition, each station must also have continuous communications access to the controlling device, i.e., that device which controls station interconnects by the assignment of frequency bands, for the purposes of sending status information and receiving its frequency assignments.

If the control information between each station and the controller were to be assigned an exclusive frequency band, this would severely limit the frequency bands available for station-to-station interconnects. Therefore, the controller commands to each station and the status returns from each station are all provided within a single frequency band using contention formatting, that is, the several transmitters each "contend" for use of the control channel and, of course, only one device can transmit on the control channel at one time. Each station desiring use of the control channel monitors activity at the control channel frequency and, when it becomes idle, begins transmission on that channel. Contention formatting is further justified by the nature of the control channel traffic which tends to be bursty, that is, occasional and very brief, as contrasted with station-to-station messages which may be lengthy.

As was mentioned above, each transmitting device monitors, or "listens to," the control channel to determine if any other station is using it, before beginning its own transmission. The real danger of data collision occurs when two devices begin to transmit at virtually the same time. This problem has been dealt with for baseband systems in a number of U.S. patents, including U.S. Pat. No. 4,063,220, issued to Metcalfe et al. on Dec. 13, 1977, and entitled "Multipoint Data Communications System With Collision Detection," and U.S. Pat. No. 4,099,024, issued to Boggs et al. on July 4, 1978, and entitled "Communications Network Repeater." The Metcalfe and Boggs patents show collision detection by utilizing a device which determines when a collision has actually occurred by measuring phase shift in the information signal received.

FDM systems present an additional problem related to the variations of signal amplitude on the system bus. In a baseband data system all levels on the bus are held substantially constant and collision detection involves the relatively simple task of comparing the locally transmitted signal with the signal received from the bus. However, when data is transmitted using FDM, the inherent properties of frequency modulation prohibit the detection of a colliding signal that is not close in amplitude to the locally transmitted signal. Until now, there has been no adequate system to reliably detect FDM collisions because the signal variations present on an FDM bus are sometimes quite large. The higher amplitude signal swamps out and prevents detection of the smaller amplitude signal.

One object of this invention is to provide an apparatus whereby a weak FDM-formatted signal on a data communications bus can be detected in the presence of a stronger signal.

It is a further object of this invention to provide an improved FDM transceiver which detects collisions between data signals of widely disparate amplitudes.

It is yet another object of this invention to provide an improved transmitter which will be prevented from transmitting on the system bus whenever a remotely-originated signal is present on the bus.

In accordance with the principles of the present invention, an apparatus is disclosed for transmitting and receiving RF modulated signals. The apparatus includes means for frequency modulating a baseband signal and means for combining the output signal of the modulating means with a signal received by the apparatus. Means are provided for demodulating the output signal of the combining means. Finally, the apparatus includes means for comparing the output signal of the demodulating means with the baseband signal.

Figure 2:
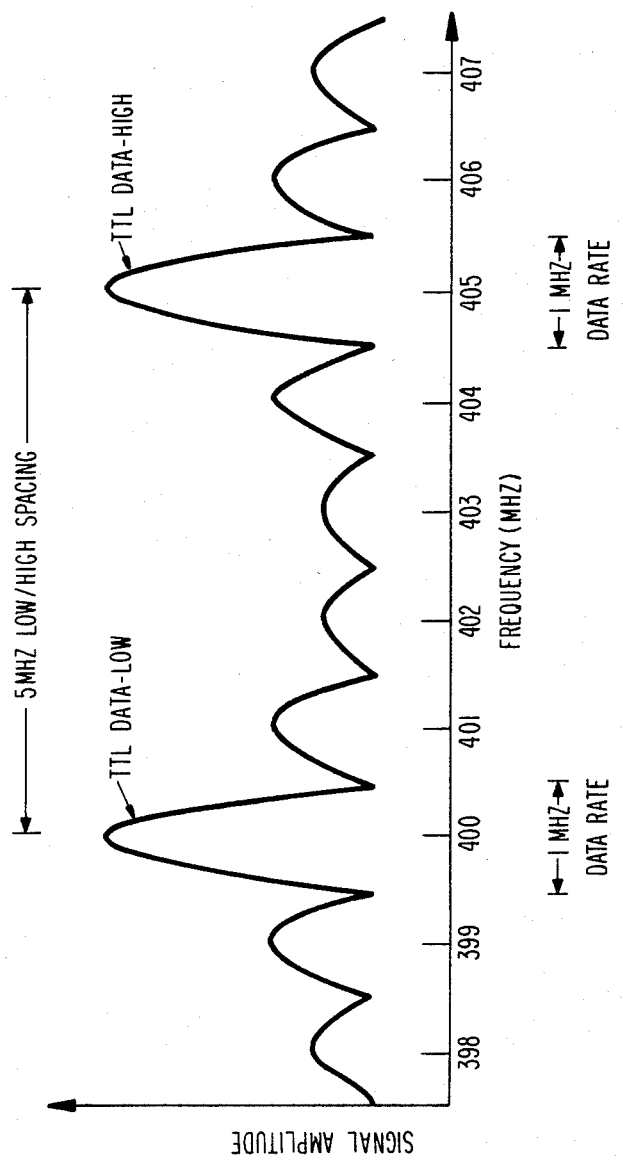

Other features and advantages of the present invention will be more fully understood from the following detailed description of the preferred embodiment, the appended claims, and the accompanying drawing, in which:

FIG. 1 is a detailed block diagram representation of the preferred embodiment; and FIG. 2 is a frequency spectrum representation of the modulation scheme of the embodiment of FIG. 1.

Referring to the block diagram of FIG. 1, the information to be transmitted by the local station, in the form of TTL data (that is, digital data signals generated by or compatible with TTL logic elements), is applied at input terminal 11 where it is coupled to modulator 21. Modulator 21 translates the TTL data to an RF frequency and the modulated signal is coupled to transmitter 22. In the present example, a frequency shift keying (FSK) modulation scheme is used, which is similar to the type illustrated in FIG. 2.

FIG. 2 depicts a portion of the frequency spectrum for a data rate of 1 MHz and a 5 MHz separation between frequencies, at a center frequency of 402.5 MHz. A low level of the TTL-data signal is converted to a 400 MHz signal and a high level is converted to a 405 MHz signal.

Modulator 21 may be, for example, a varactor oscillator which generates an output signal whose frequency is dependent on the voltage level of the input signal, thus providing a coherent FSK signal. Alternatively, modulator 21 may cause switching between two RF signals in response to the level changes of the TTL data input signal, thus providing a noncoherent FSK signal.

The output signal from transmitter 22 is applied to terminal 24a of splitter 24. Splitter 24 may be a hybrid junction with small signal attenuation between terminals 24a and 24b and between terminals 24b and 24c, but with considerable isolation between terminals 24a and 24c. In the present example splitter 24 will attenuate a signal by 3 db between terminals 24a and 24b, and also 3 db between terminals 24b and 24c, but a signal applied at terminal 24a will appear at terminal 24c attenuated by 30 db. Terminal 24b is coupled to tap 25 which interfaces the local transceiver with system bus 26.

The signal at terminal 24c of splitter 24, which may have originated on bus 26 (and is slightly attenuated) or which may have originated in transmitter 22 (and is greatly attenuated), is applied to receiver 27 which inter alia down-converts the incoming RF signal to a more manageable IF signal having, perhaps, a center frequency of 10.7 MHz. Thus a TTL low level signal would be represented at the output terminal of receiver 27 as an 8.2 MHz signal (10.7−2.5), and a TTL high level signal would be represented as a 13.2 MHz signal (10.7+2.5).

The receiver 27 output signal is applied to the input terminals of demodulators 28 and 29. Low frequency demodulator 28 comprises band-pass filter 30, which, in the present example, is tuned to a center frequency of 8.2 MHz, logarithmic amplifier 31, AM detector 32, and threshold detector 33. High frequency demodulator 29 comprises band-pass filter 34, which is tuned to a center frequency of 13.2 MHz, logarithmic amplifier 35, AM detector 36, and threshold detector 37. With the exception of the pass-band frequencies of filters 30 and 34, the balance of the corresponding components of demodulators 28 and 29 are identical.

Considering first low frequency demodulator 28, filter 30 passes only the portion of the IF output signal from receiver 27 which corresponds to a low level TTL signal. This signal is applied to logarithmic amplifier 31 which provides a limited range of output signals for wide variations in input signal. Logamps are also advantageous for their fast response time. The output signal of amplifier 31 is applied to AM detector 32 which removes the IF component, leaving only the envelope corresponding to the low level elements of a TTL signal, essentially a digital signal. Threshold detector 33 shifts the output signal of AM detector 32 so as to be compatible with TTL levels, while additionally providing noise immunity. The output signal of threshold detector 33 is applied to a first input of TTL NAND gate 40.

High frequency demodulator 29 performs a similar function on the IF output signal from receiver 27 corresponding to a high level TTL signal. Thus, the signal emitted by threshold detector 37 is a TTL-compatible signal which, when inverted by TTL logic inverter 39, is essentially identical with the output signal of threshold detector 33. Thus the output signal of NAND gate 40 will be a logic low when there is a TTL-low-modulated signal entering receiver 27, and a logic high when there is a TTL-high-modulated signal at receiver 27. The output signal of NAND gate 40 represents, in digital form, the signal recovered from system data bus 26 and is coupled to the local station utilization means (not shown) via output terminal 13 as the RECOVERED DATA signal. This signal is also applied to a first input terminal of TTL exclusive OR gate 41.

The locally-generated TTL data signal, transmitted via modulator 21, transmitter 22, splitter 24 and tap 25, onto bus 26 is also coupled through delay circuit 42 to the second input terminal of exclusive OR gate 41. The delay period of delay circuit 42 is equivalent to the delay of the TTL data signal through modulator 21, transmitter 22, splitter 24, receiver 27, demodulators 28 or 29, and gate 40. Thus, if there is no signal being received from bus 26, identical signals are presented to the two input terminals of exclusive OR gate 41. Delay circuit 42 may comprise, for example, a monostable multivibrator configured to delay the propagation of a signal applied to its input terminal for a presettable period of time. Fine tuning of the delay timing may be accomplished by a potentiometer adjustment.

One shot circuit 43, which may be, for example, a monostable multivibrator, acts as a filter of the output signal from gate 41, removing any high frequency pulses which may result from switching transients at the input terminals of gates 40 and 41. The signal at the output of one shot circuit 43 is applied to output terminal 14 and when true (high logic level), indicates to the controlling means (not shown), that a collision has occurred between locally-generated and remotely-generated data.

Summing circuit 38, whose inputs are coupled respectively to the output terminals of AM detectors 32 and 36, provides an indication of signal activity on bus 26 to inhibit circuit 23. If such signal activity exists, circuit 23 provides an inhibit signal to transmitter 22 and to output terminal 15, where it is received by a utilization means (not shown) as a CHANNEL BUSY indication. If, however, the signal activity detected in summing circuit 38 is a result of locally-generated data traffic, the LOCAL KEY signal applied at input terminal 12 overrides the inhibit signal provided at transmitter 22 and output terminal 15.

The apparatus of the present invention performs two functions. It detects data collisions by comparing the baseband data being transmitted by the local station with the baseband data on the system bus, and it avoids data collisions by monitoring the system bus and inhibiting the local transmitter when there is signal activity on the bus.

When operating as a collision detector, baseband digital data, applied at input terminal 11 is FSK-modulated by modulator 21, and is transmitted onto the system bus 26 by transmitter 22 via splitter 24 and tap 25. A small fraction of the locally-transmitted signal, applied at port 24a, reaches port 24c. This small fraction of signal is combined with the signal received at port 24b from bus 26 via tap 25, which arrives at port 24c with much less attenuation. The combined signal is down-converted in frequency by receiver 27 and the resulting signal is applied to demodulators 28 and 29.

The lower frequency component, corresponding, in the present example, to a low logic level baseband signal, is passed by filter 30 to logarithmic amplifier 31, which tends to provide a uniform output signal level for wide variations in input signal level. AM detector 32 extracts the envelope of the output signal from amplifier 31, and threshold detector 33 converts the envelope signal to logic-compatable levels while filtering out noise. Thus, the output of demodulator 28 is a logic high level corresponding to a logic low level baseband signal originating locally or received from bus 26.

Similarly, demodulator 29 receives the higher frequency component of the output signal from receiver 27, corresponding to a logic high level baseband signal. The signal output provided by demodulator 29 is thus a logic high level corresponding to a logic high level baseband signal originating locally or received from bus 26.

The output signal from demodulator 29 is logically inverted by inverter 39, and the resulting signal applied to one input of NAND gate 40. With the second input of gate 40 coupled to the output of demodulator 28, it can be seen that the signals at the inputs to gate 40 will both be high for a low level baseband signal and will both be low for a high level baseband signal. The signal at the output terminal of gate 40, coupled to output terminal 13, has the same polarity as the corresponding baseband signal and therefore represents RECOVERED DATA.

If there is no signal received from bus 26, through splitter 24, receiver 27, demodulators 28 and 29, and gate 40, the signal at the output terminal of gate 40, and applied to a first input terminal of exclusive OR gate 41, will be the same signal applied at input terminal 11, delayed through delay circuit 42, and coupled to a second input terminal of gate 41. This being the case, the signal at the output terminal of gate 41, and applied via one shot circuit 43 to output terminal 14 will be a steady low level, and the COLLISION DETECTED signal will remain false.

If, however, there is signal activity on bus 26, the signal at the output terminal of gate 40 will fail to track the data applied at input terminal 11 (including its delay through circuit 42), and the COLLISION DETECTED signal will exhibit high and low levels, indicating to the controller (not shown) the presence of a data collision.

When acting as an apparatus for avoiding collisions, the present invention monitors the signal activity on bus 26. Bus signals are applied to receiver 27 via tap 25 and splitter 24. Receiver 27 down-converts the frequency of the received signal and applies the down-converted signal to demodulators 28 and 29. Detectors 32 and 36 extract the baseband data signals which, if present, are represented as high level signals and which are applied to summing circuit 38. Therefore, if there is signal activity on bus 26, a high-level output signal will be coupled to inhibit circuit 23 from summing circuit 38, thereby causing the operation of transmitter 22 to be inhibited during such signal activity. When, however, the signal activity detected in demodulators 28 and 29 is a result of a locally-generated signal, the LOCAL KEY signal applied to inhibit circuitry 23 overrides the inhibiting function, permitting transmitter 22 to continue its operation.

Other embodiments of the present invention will be apparent to those skilled in the art to which it pertains. The scope of this invention is not intended to be limited to the embodiment disclosed herein but should instead be gauged by the breadth of the claims which follow.

What is claimed is:

1. An apparatus for transmitting RF modulated signals onto a communications medium and for receiving RF modulated signals from said communications medium, said apparatus including:
    means for frequency modulating a baseband signal;
    means for transmitting the output signal of said frequency modulating means to said communications medium and for receiving a signal from said communications medium;
    said transmitting and receiving means further including means for combining the output signal of said frequency modulating means with said signal received from said communications medium;
    means for demodulating the output signal of said combining means; and
    means for comparing the output signal of said demodulating means with said baseband signal.

2. The apparatus according to claim 1 wherein said combining means includes a 3-port splitter, said splitter providing relatively greater attenuation to said output signal of said modulating means than to said received signal.

3. The apparatus according to claim 1 wherein said demodulating means includes a logarithmic amplifier.

4. The apparatus according to claim 1 wherein said frequency modulating means provides frequency shift keying (FSK) modulation.

5. The apparatus according to claim 1 further including means for converting the RF frequencies of said output signal of said combining means to intermediate frequencies (IF's).

6. The apparatus according to claim 5 wherein said demodulating means includes a high-frequency demodulator and a low-frequency demodulator.

7. The apparatus according to claim 6 wherein said high-frequency demodulator includes a first filter tuned to pass only signals within a range of frequencies centered about a relatively high frequency component of said IF's, and said low-frequency demodulator includes a second filter tuned to pass only signals within a range of frequencies centered about a relatively low frequency component of said IF's.

8. The apparatus according to claim 7 wherein each of said two demodulators further includes:
    a logarithmic amplifier coupled at its input to the output terminal of said filter; and
    detector means for providing a signal indicative of the envelope of the output signal of said logarithmic amplifier.

9. The apparatus according to claim 8 wherein said envelope signals of said detector means are coupled to said modulating means.

10. The apparatus according to claim 9 further including means responsive to said envelope signals of said detector means for inhibiting the output signal of said modulating means when either of said envelope signals indicates the presence of said IF's in said combined signal.

11. The apparatus according to claim 10 further including terminal means for receiving a signal indicative of the presence of said baseband signal, said terminal means coupled to said inhibiting means for disabling said inhibiting means when said baseband signal is present.

12. The apparatus according to claim 6 wherein said demodulator means includes a gate coupled at its inputs to the respective output terminals of said high-frequency and said low-frequency demodulators, wherein the output signal of said gate represents the data recovered from said received signal.

13. The apparatus according to claim 1 further including a delay circuit for delaying said baseband signal coupled to said comparing means, wherein the delay of said delay circuit is substantially equal to the sum of the delays encountered by said baseband signal in said modulating means, said combining means, and said demodulating means.

14. The apparatus according to claim 1 wherein said comparing means includes an exclusive OR gate.

15. In a transceiver for use in a frequency division multiplex (FDM) data transmission system, wherein said transceiver transmits baseband data signals modulated according to a frequency shift keying (FSK) format and receives FSK-modulated data signals, an apparatus for detecting coincidence of data transmissions originated by said transceiver and by a remote transceiver within said FDM system, said apparatus comprising:

means for modulating said baseband signal;

means for combining the output signal of said modulating means with a modulated signal received from said FDM system;

means for demodulating the output signal of said combining means; and means responsive to the output signal of said demodulating means and said baseband signal for detecting said coincident data transmissions.

16. The apparatus according to claim 15 wherein said combining means includes a 3-port splitter, said splitter providing relatively greater attenuation to said output signal of said modulating means than to said signal received from said FDM system.

17. The apparatus according to claim 15 wherein said demodulating means includes a logarithmic amplifier.

18. The apparatus according to claim 15 further including means for converting the RF frequencies of said output signal of said combining means to intermediate frequencies (IF's).

19. The apparatus according to claim 18 wherein said demodulating means includes a high-frequency demodulator and a low-frequency demodulator.

20. The apparatus according to claim 19 wherein said high-frequency demodulator includes a first filter tuned to pass only signals within a range of frequencies centered about a relatively high frequency component of said IF's, and said low-frequency demodulator includes a second filter tuned to pass only signals within a range of frequencies centered about a relatively low frequency component of said IF's.

21. The apparatus according to claim 20 wherein each of said two demodulators further includes:

a logarithmic amplifier coupled at its input to the output terminal of said filter; and means for providing a signal indicative of the envelope of the output signal of said logarithmic amplifier.

22. The apparatus according to claim 19 wherein said demodulator means includes a gate coupled at its inputs to the respective output terminals of said high frequency and said low-frequency demodulators, wherein the output signal of said gate represents the data recovered from said received signal.

23. The apparatus according to claim 15 further including a delay circuit for delaying said baseband signal coupled to said detecting means, wherein the delay of said delay circuit is substantially equal to the sum of the delays encountered by said baseband signal in said modulating means, said combining means, and said demodulating means.

24. The apparatus according to claim 15 wherein said detecting means includes an exclusive OR gate.

25. In a transceiver for use in a frequency division multiplex (FDM) data transmission system, wherein said transceiver transmits baseband data signals RF-modulated according to a frequency shift keying (FSK) format and receives FSK-modulated data signals, an apparatus for preventing a data transmission by said transceiver in the presence of a data transmission originated by a remote transceiver within said FDM system, said apparatus comprising:

means for transmitting modulated data signals into said FDM system;

means for demodulating signals received from said FDM system, said demodulating means including a high-frequency demodulator having a first filter tuned to pass only signals of a relatively high frequency, and a low-frequency demodulator having a second filter tuned to pass only signals of a relatively low frequency;

each of said two demodulators including a logarithmic amplifier coupled at its input to the output of said filter, and detector means for providing a signal indicative of the envelope of the output signal of said logarithmic amplifier; and means responsive to the output signals of said two detector means for disabling data transmissions by said transmitting means, said disabling means including means for summing said envelope signals of said two detector means.

26. The apparatus according to claim 25 further including means for converting the RF frequencies of said received signals to intermediate frequencies (IF's).

27. The apparatus according to claim 25 wherein said transmitting means includes means for generating a keying signal when said transmitting means is transmitting data signals into said FDM system, and wherein said keying signal is coupled to said disabling means to inhibit the function of said disabling means when said transmitting means is transmitting data signals.

* * * * *